Sept. 6, 1960  E. C. COLYER ET AL  2,951,571
EMBOSSING MACHINES
Filed Sept. 4, 1957  11 Sheets-Sheet 1

Inventors
Edwin C. Colyer
Elmer A. Schultz
By Wallace and Cannon
Attorneys

Sept. 6, 1960

E. C. COLYER ET AL 2,951,571

EMBOSSING MACHINES

Filed Sept. 4, 1957

Inventors
Edwin C. Colyer
Elmer A. Schultz
By Wallace and Cannon
Attorneys

Sept. 6, 1960

E. C. COLYER ET AL 2,951,571

EMBOSSING MACHINES

Filed Sept. 4, 1957

Inventors
Edwin C. Colyer
Elmer A. Schultz
By Wallace and Cannon
Attorneys

Sept. 6, 1960 E. C. COLYER ET AL 2,951,571
EMBOSSING MACHINES
Filed Sept. 4, 1957 11 Sheets-Sheet 5
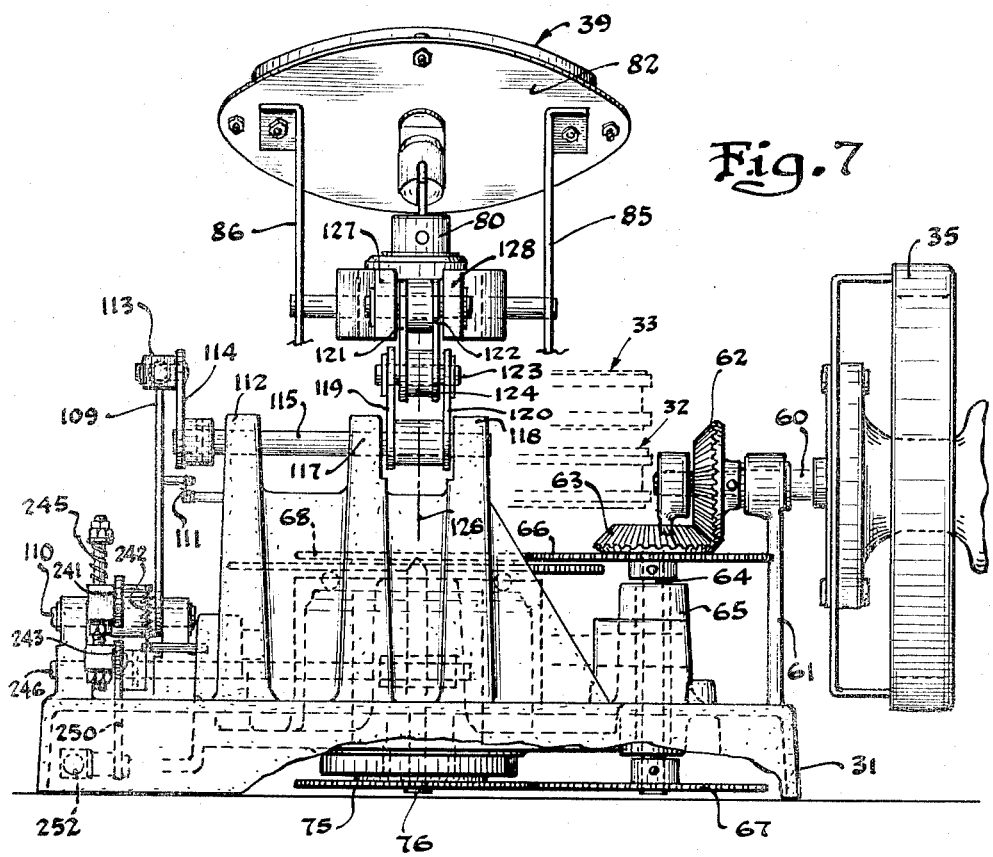
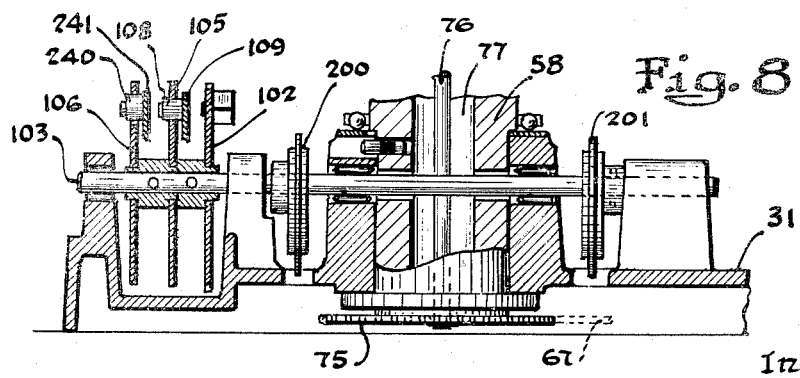
Inventors
Edwin C. Colyer
Elmer A. Schultz
By Wallace and Cannon
Attorneys

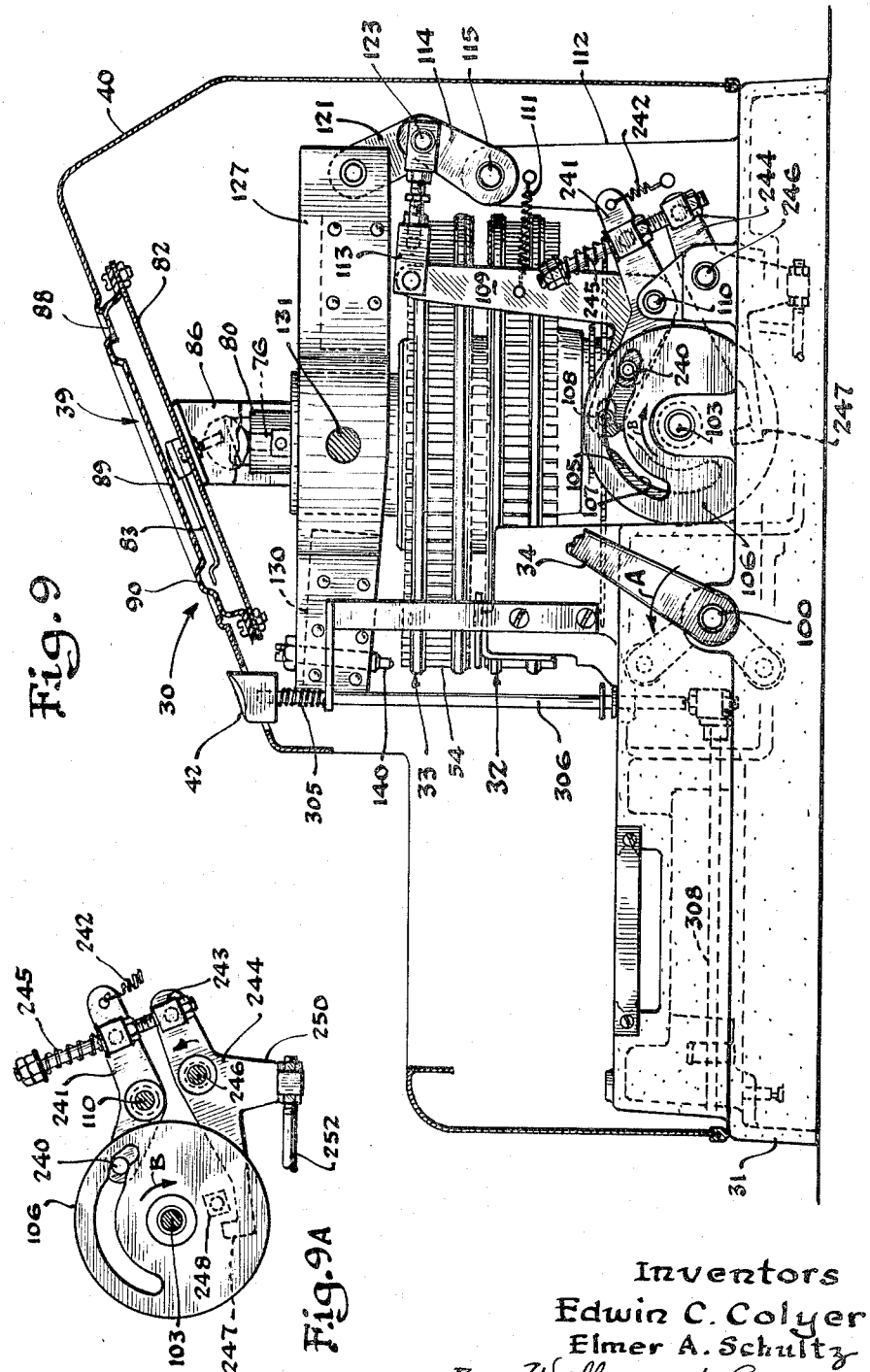

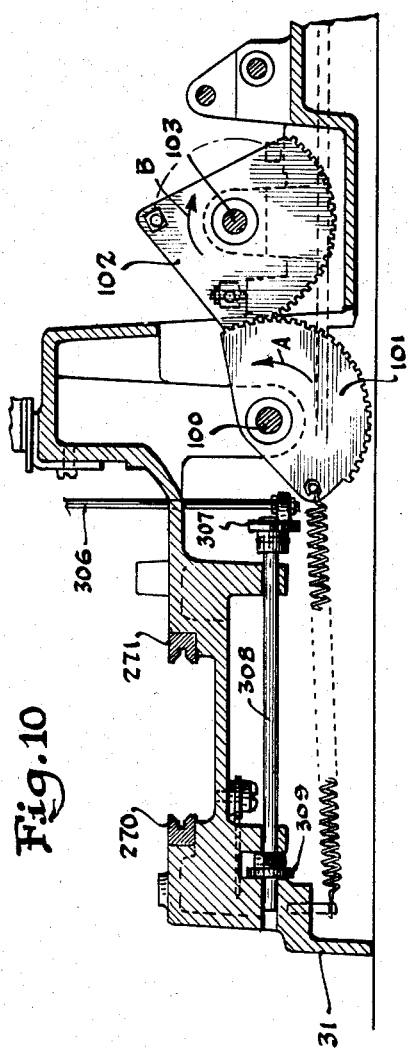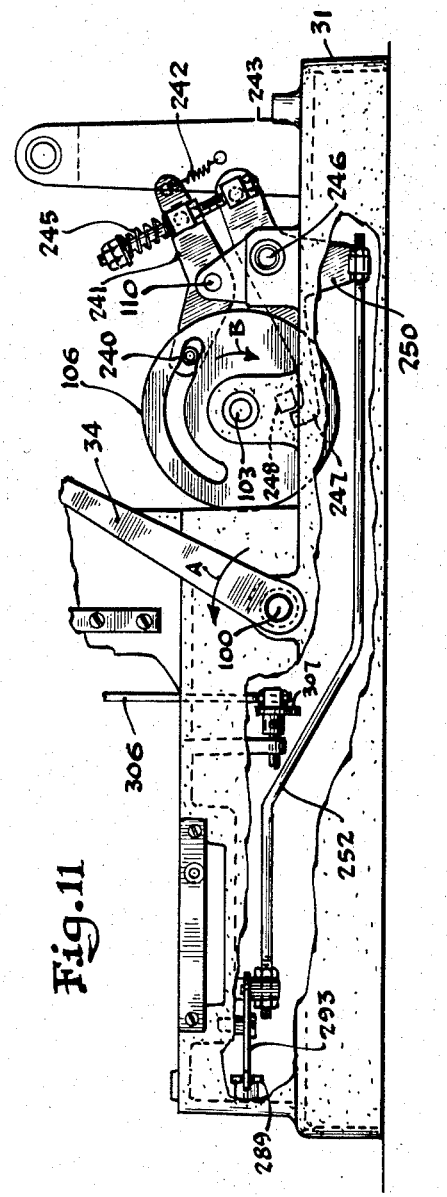

Sept. 6, 1960   E. C. COLYER ET AL   2,951,571
EMBOSSING MACHINES
Filed Sept. 4, 1957   11 Sheets-Sheet 8
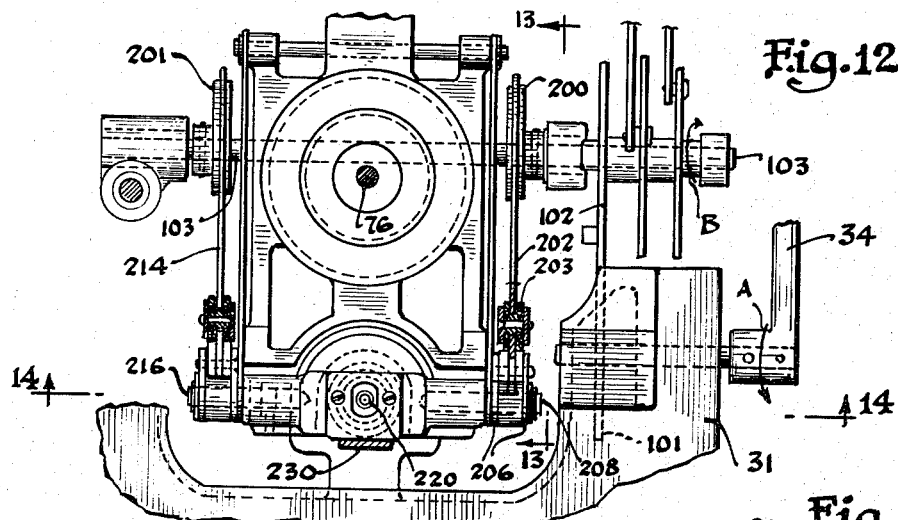
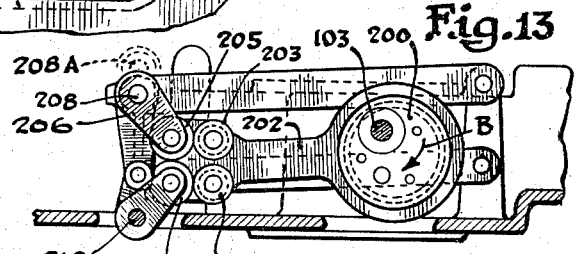
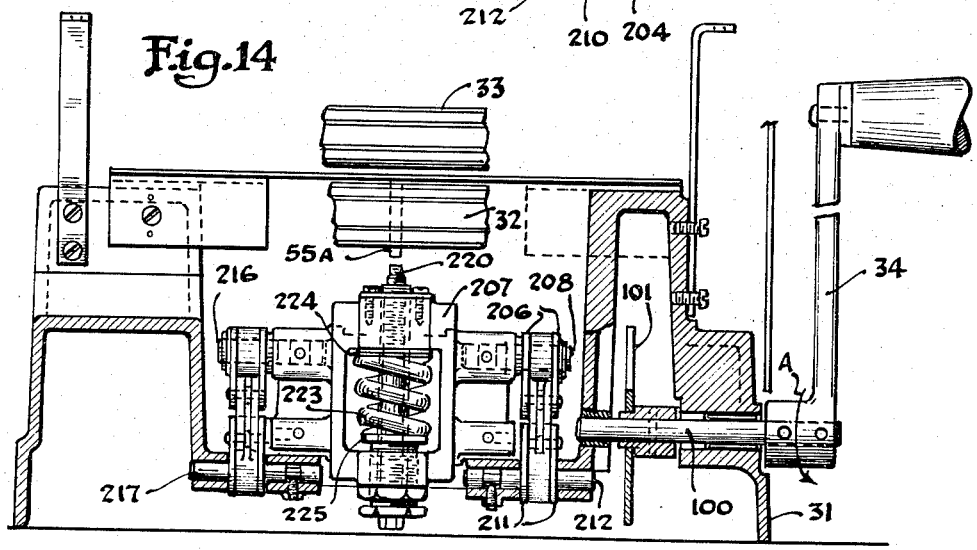
Inventors
Edwin C. Colyer
Elmer A. Schultz
By Wallace and Cannon
Attorneys

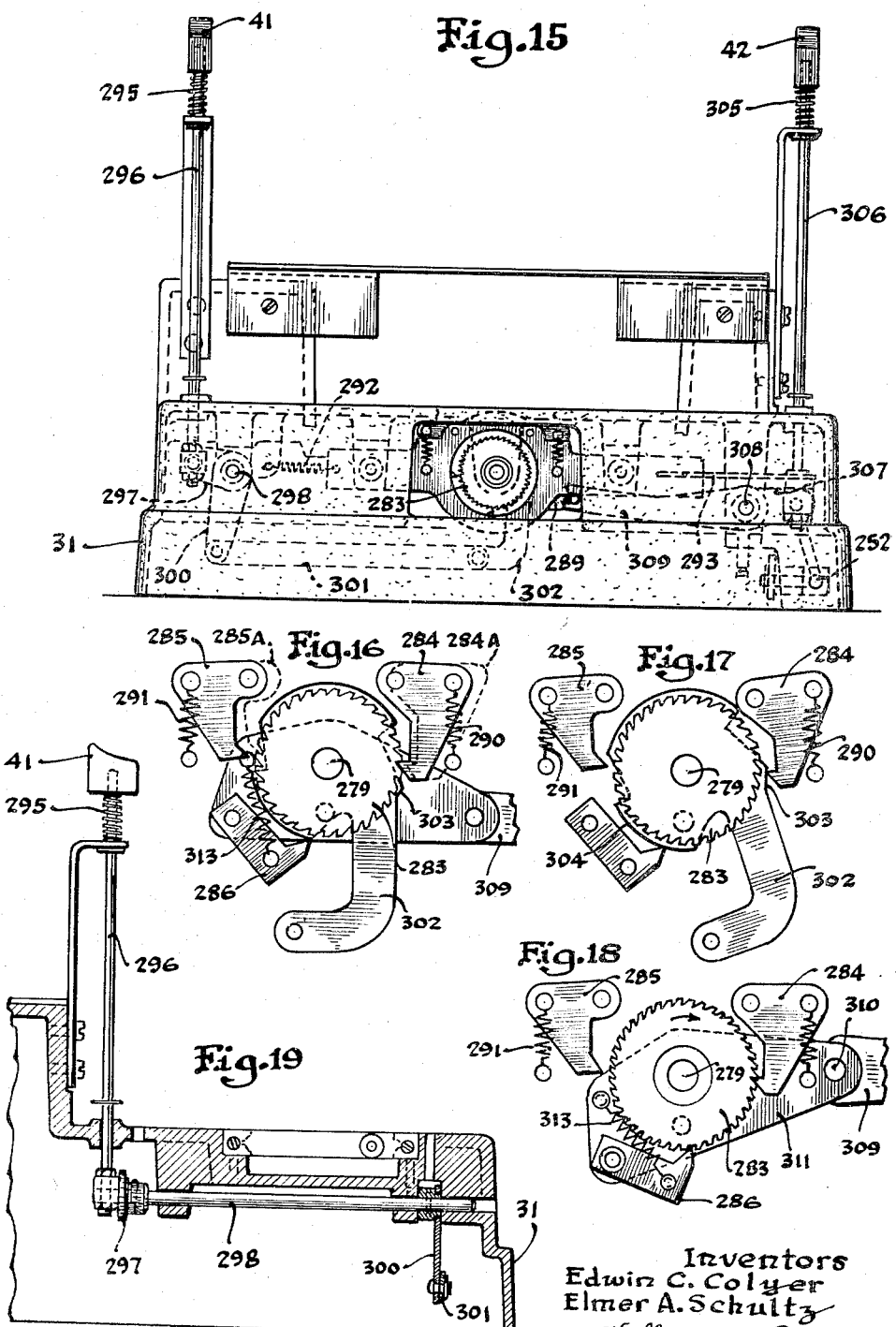

Sept. 6, 1960 E. C. COLYER ET AL 2,951,571
EMBOSSING MACHINES
Filed Sept. 4, 1957 11 Sheets-Sheet 10
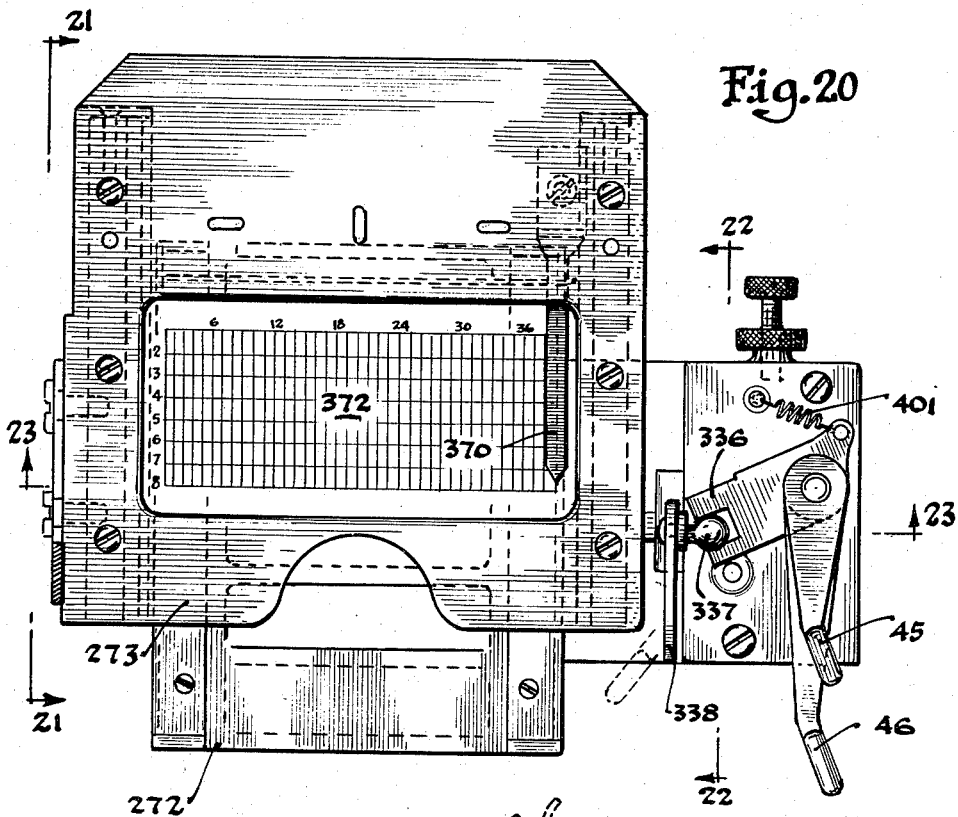
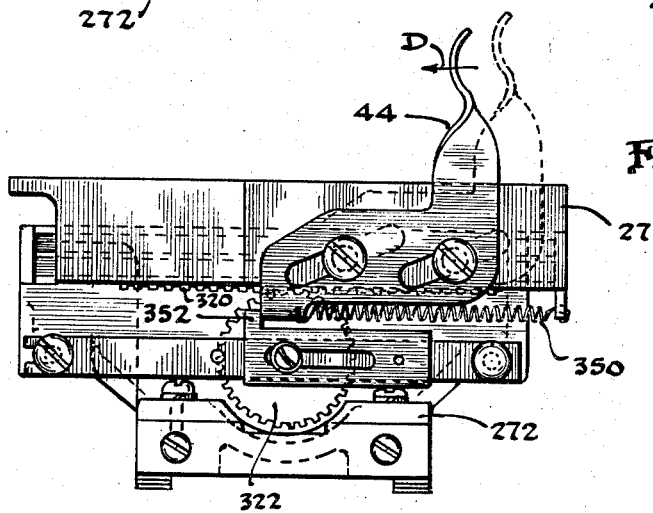
Inventors
Edwin C. Colyer
Elmer A. Schultz
By Wallace and Cannon
Attorneys Sept. 6, 1960　　　E. C. COLYER ET AL　　　2,951,571
EMBOSSING MACHINES
Filed Sept. 4, 1957　　　　　　　　　11 Sheets-Sheet 11
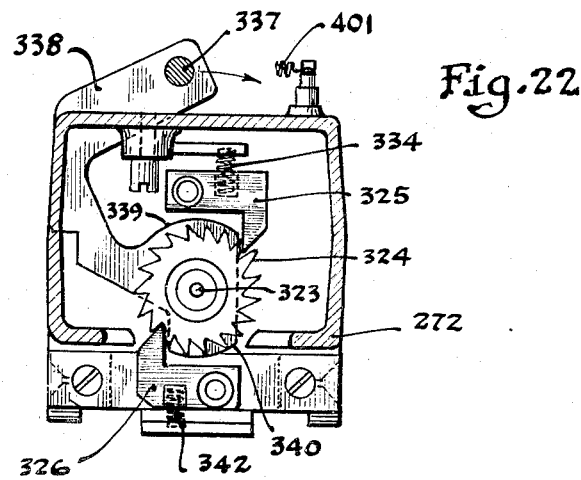
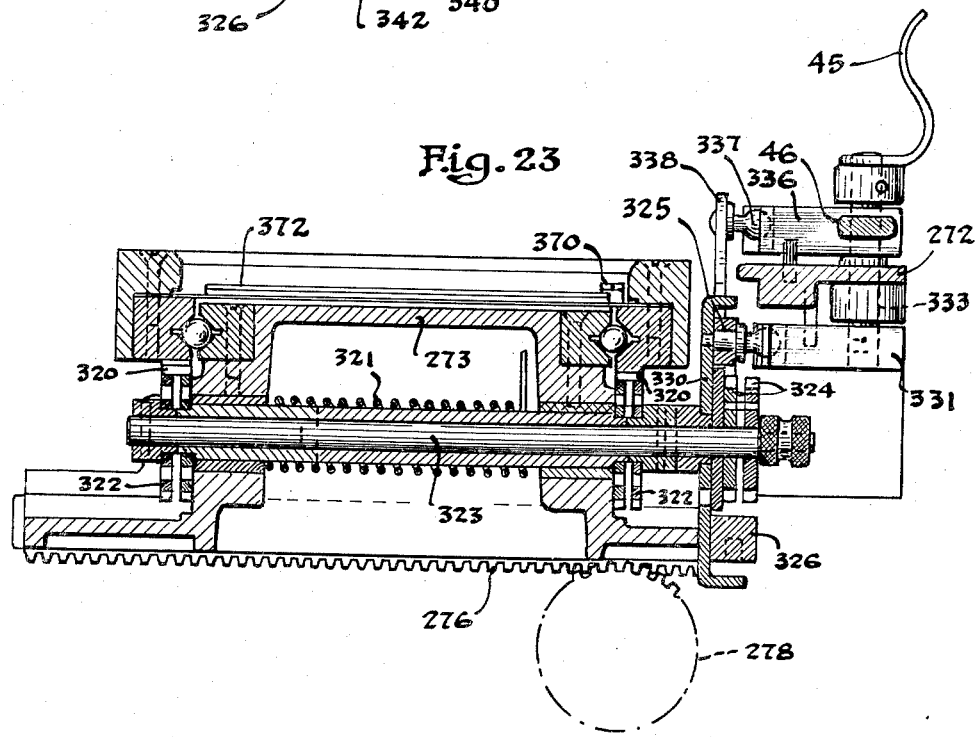
Inventors
Edwin C. Colyer
Elmer A. Schultz
By Wallace and Cannon
Attorneys

United States Patent Office 2,951,571
Patented Sept. 6, 1960

2,951,571

EMBOSSING MACHINES

Edwin C. Colyer, Willoughby, and Elmer A. Schultz, Euclid, Ohio, assignors to Addressograph-Multigraph Corporation, Cleveland, Ohio, a corporation of Delaware Filed Sept. 4, 1957, Ser. No. 682,009

17 Claims. (Cl. 197—6.7)

This invention relates to embossing machines. The invention is particularly advantageous when applied to manually operable embossing machines of the kind utilized in the manufacture of printing plates and similar devices, whether formed from sheet metal, plastic, or other suitable materials, and will therefore be described in that connection.

Embossed metal plates have long been utilized in addressing machines and similar applications and also for identification tags and like applications; more recently, embossed plastic plates have also been utilized in many similar applications. The embossing machines employed to manufacture such printing devices or the like have varied substantially in size and complexity depending upon the rate of productivity desired for the embossing machine and, to some extent, the nature of the devices embossed by the machine. Thus, relatively large, complex, and expensive machines have been utilized for high speed mass production of printing plates utilized in mass mailing operations, whereas much smaller and less expensive manually operable embossing machines are usually employed for the production of limited numbers of printing devices for use in relatively small mailing operations or in the production of identification tags and other similar devices. The present invention is concerned primarily with a relatively small and compact manually operable machine which may be put to advantageous use in the latter kind of application.

The manually operable embossing machines previously known in the art have, in general, been satisfactory in service and have been successfully utilized in numerous small-volume embossing operations. These machines, however, have presented some difficulties with respect to machine operation and economy of manufacture. Thus, in some hand-operated embossing machines, the effort required upon the part of the operator to effect an embossure in the printing device or other device being manufactured is relatively large and, as a consequence, operation of such machines tends to be fatiguing to the operator. Moreover, the requirements for clear and explicit indication of the type characters selected for embossure have to a certain extent conflicted with the requirements for ease of operation, since the indicator device must be accurately registered with respect to the punches and dies of the embossing machine and consequently must be mechanically connected to the selector mechanism of the machine. In addition, the carriage control and drive mechanisms of previously known embossing machines have not always been completely satisfactory with respect to convenience of operation, particularly in the relatively low-cost machines employed for low-volume applications.

A principal object of the invention, therefore, is a new and improved manually operable embossing machine which is convenient to operate yet which is compact in size and relatively inexpensive to manufacture.

A more specific object of the invention is a new and improved manually operable embossing machine in which the effort required on the part of the operator to effect an embossing operation is held to a minimum, thereby avoiding undue fatigue on the part of the operator.

A further object of the invention is a new and improved type character selection mechanism for a manually operable embossing machine which includes a type character indicator that is to a substantial extent independent of the type selection drive mechanism and consequently avoids any conflict with the embossing machine drives.

Another object of the invention is a new and improved embossing machine carriage and carriage drive mechanism which is simple and economical in construction yet which affords convenient and readily accessible means for controlling all of the desired movements of the carriage with respect to the die head of the machine.

A corollary object of the invention is a new and improved manually operable embossing machine in which the punch and die drive mechanisms are relatively simple and economical in construction and afford a maximum mechanical advantage to the operator.

Other and further objects of the present invention will be apparent from the following description and claims and are illustrated in the accompanying drawings which, by way of illustration, show a preferred embodiment of the present invention and the principles thereof and what we now consider to be the best mode in which we have contemplated applying these principles. Other embodiments of the invention embodying the same or equivalent principles may be used and structural changes may be made as desired by those skilled in the art without departing from the present invention and the purview of the appended claims.

In the drawings:

Fig. 7 is a rear view of the machine;

Fig. 8 is a detail sectional view of a portion of the drive mechanism of the embossing machine taken along line 8—8 in Fig. 4;

Fig. 9 is an elevation view of the operating mechanism of the embossing machine, some of the parts being broken away to facilitate description of the operating linkages;

Fig. 9A is an enlarged detail view of a part of the mechanism of Fig. 9;

Fig. 10 is a sectional view of a portion of the embossing machine operating mechanism taken along line 10—10 in Fig. 4;

Fig. 11 is a partial elevation view showing some portions of the operating mechanism not included in Fig. 9;

Fig. 12 is a detail sectional view showing one of the major drive linkages of the embossing machine;

Fig. 13 is a further detail sectional view taken along line 13—13 in Fig. 12;

Fig. 14 is a further detail sectional view taken along line 14—14 in Fig. 12;

Fig. 15 is a front sectional view illustrating the carriage-operating mechanism of the embossing machine;

Fig. 16 is a detail view showing the character-spacing ratchet mechanism of the embossing machine;

Fig. 17 is a detail view illustrating the operation of the carriage release of the machine;

Fig. 18 is another detail view of the character-spacing mechanism employed in describing the operation of the back spacing mechanism;

Fig. 19 illustrates the actuating mechanism for the back-spacing device;

Fig. 20 is a plan view showing the carriage of the embossing machine;

Fig. 21 is an elevation view of the carriage taken along line 21—21 in Fig. 20;

Fig. 22 is a detail sectional view of the line-spacing mechanism of the carriage taken along line 22—22 in Fig. 20; and Fig. 23 is a sectional view of the carriage taken along line 23—23 in Fig. 20.

General description

Figure 1:
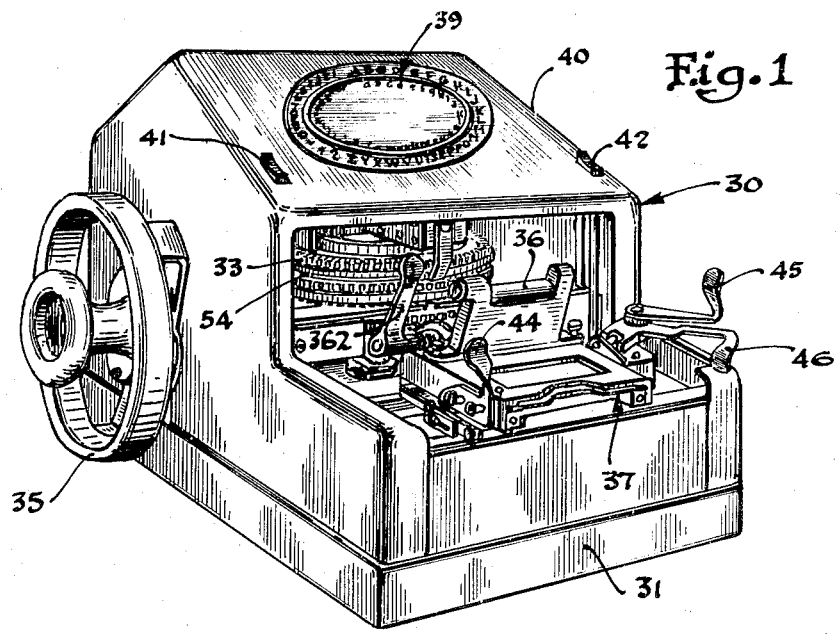
Fig. 1 is a perspective view of an embossing or indenting machine constructed in accordance with one embodiment of the invention.
Figure 2:
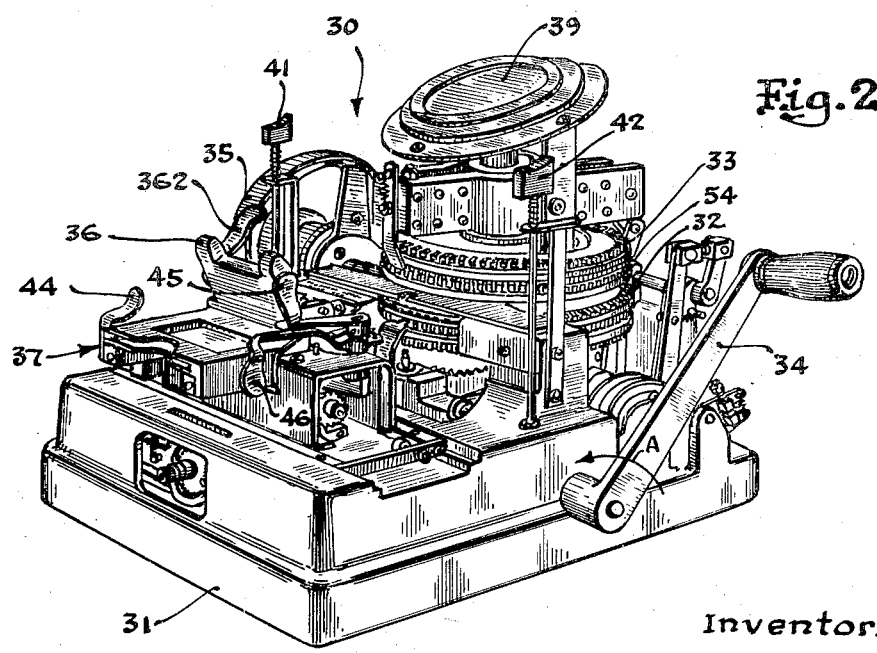
Fig. 2 is a perspective view of the embossing machine of Fig. 1 with the cover of the machine removed.

The embossing machine 30 illustrated in Figs. 1 and 2, which are perspective views of one embodiment of the inventive concept, comprises a base 31 upon which a rotary die head 54 comprising a punch section 32 and a die section 33 is supported. The embossing machine further includes an operating handle 34 which is utilized to drive the embossing machine through an embossing operation and a hand wheel 35 which comprises the control element for the selection of the different type characters. A suitable workholder 36 of essentially conventional construction is included in the embossing machine 30 and is mounted upon a carriage 37; the carriage 37 is supported upon base 31 and is mechanically connected to the operating handle 34 as will be described more completely hereinafter. The embossing machine further includes a type character indicator 39 which is mounted adjacent the top front face of the cover 40 of the embossing machine.

The actuating and control mechanism for the embossing machine 30 includes a number of different devices, all of which will be described in detail hereinafter. Thus, the embossing machine is provided with a carriage-release mechanism actuated from the carriage release control button 41 and with a back-space mechanism actuated from the back-space control button 42. The carriage 37 includes an indexed carriage-advancing lever 44, a line-space lever 45, and a line space return lever 46.

Operation of the embossing machine 30 is extremely simple and convenient. At the outset, if it is assumed that the machine is to be utilized in the manufacture of printing devices or the like, a suitable thin metal or plastic plate to be embossed is inserted into the workholder 36 as will be described in detail hereinafter. The workholder is then moved to the position shown in Figs. 1 and 2 and the indexed carriage-advancing lever 44 is pushed toward the machine to advance the plate into a position in which the first line of type may be embossed therein by the punches and dies supported in die head 54. The carriage 37 is then moved to the left, as seen in Figs. 1 and 2, to a starting position which is determined by an adjustable stop affixed to the base of the machine. This establishes the metal or plastic plate in the initial embossing position and conditions the machine for initial operation.

Figure 6:
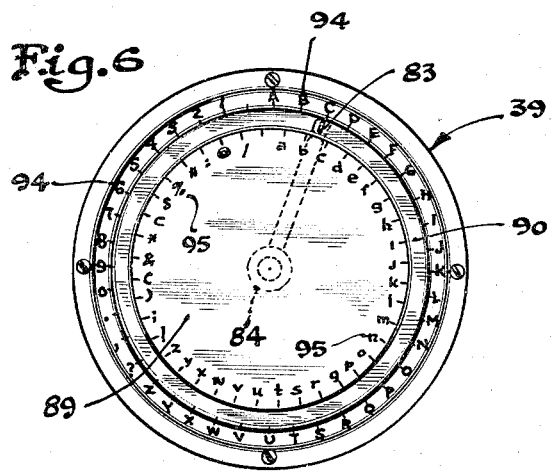
Fig. 6 is an enlarged view showing the character selection indicator of the embossing machine.

To select the first type character to be embossed in the plate, hand wheel 35 is rotated until a pointer, illustrated hereinafter in Fig. 6, is in alignment with the desired type character as shown on a scale on the indicator 39. Operating handle 34 is then rotated in a counter-clockwise direction as indicated in Fig. 2 by arrow A to emboss the selected character in the plate; when the embossing movement has been completed, the handle is returned by the operator to the initial or normal position shown in Fig. 2. Actuation of the operating handle also serves to advance the carriage 37 one character space and thus positions the plate for embossure of the next type character therein. This process is repeated until the first line of type has been embossed completely in the plate.

After the first line of type has been completed, the line spacing operating lever 45 is moved to the left, as seen in Fig. 1, advancing the plate one line space into the embossing machine. The carriage is then returned to the left-hand margin and the second line of type is embossed in the plate in essentially the same manner as the first one. If, for any reason, it is desired to move the carriage completely to the right, this may be accomplished simply by pushing on the carriage release control button 41. Similarly, pressure applied to control button 42 causes the carriage to back space by one character space.

As soon as the desired number of lines have been embossed in the metal or plastic plate to form the desired printing device or other embossed device, the line space return lever 46 is actuated by the operator, being moved to the left as seen in Figs. 1 and 2, thereby causing the carriage 37 to move to its retracted position with the plate clear of the punch and die heads 32 and 33. The plate is then removed from the workholder 36 and the next plate may be inserted therein to permit embossure of another printing device or the like.

Punch and die selection

Figure 3:
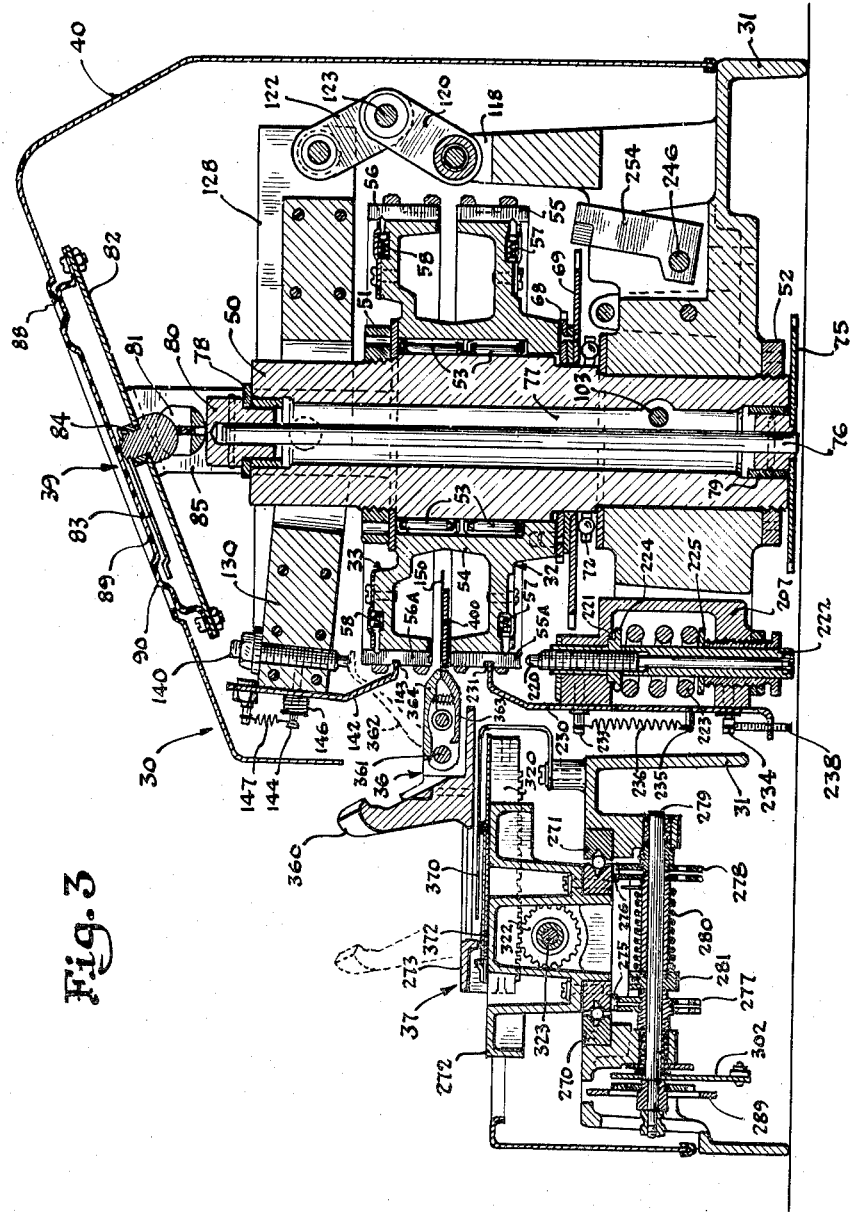
Fig. 3 is a sectional elevation view taken longitudinally through the center of the embossing machine of Figs. 1 and 2.

The punch and die head structure of the embossing machine 30 and the character selection mechanism of the machine are best shown in several views of Figs. 3–7. As indicated therein, the embossing machine 30 includes a stationary cylindrical mounting member 50 which is affixed to the base 31 of the machine as by the retaining rings 51 and 52 which are threaded onto the mounting member or post 50. The die head 54 is rotatably supported upon the post 50, being provided with suitable bearings as indicated at 53 in the drawing. In the preferred construction, as indicated in Fig. 3, the die head 54 comprises a single casting, the lower portion 32 of which supports a plurality of individual punches 55, whereas the upper portion 33 supports a corresponding plurality of individual dies 56. The punches 55 and dies 56 are supported in die head 54 by means of the individual punch and die detenting devices 57 and 58.

Figure 4:
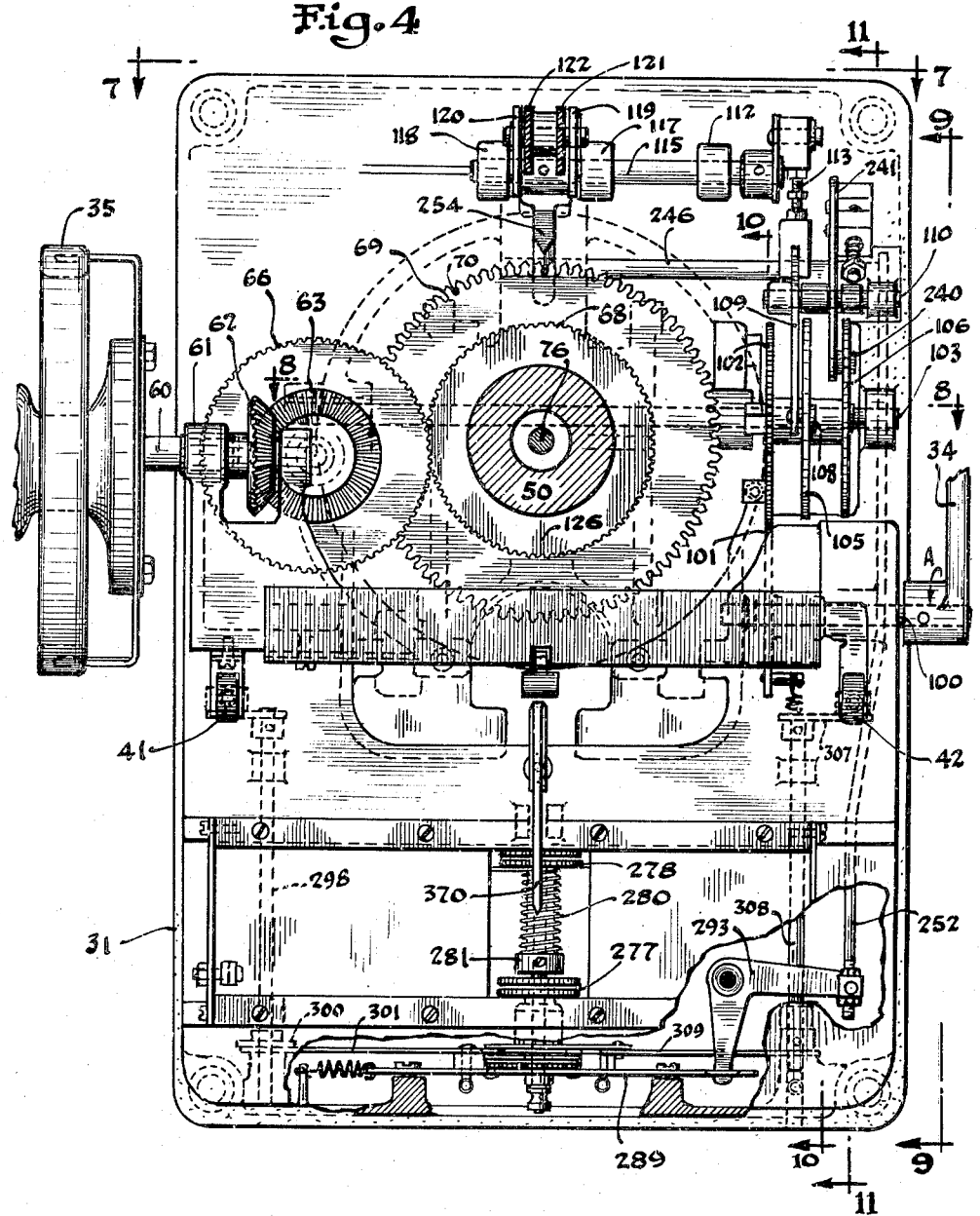
Fig. 4 is a sectional plan view of the embossing machine taken below the die head thereof.
Figure 5:
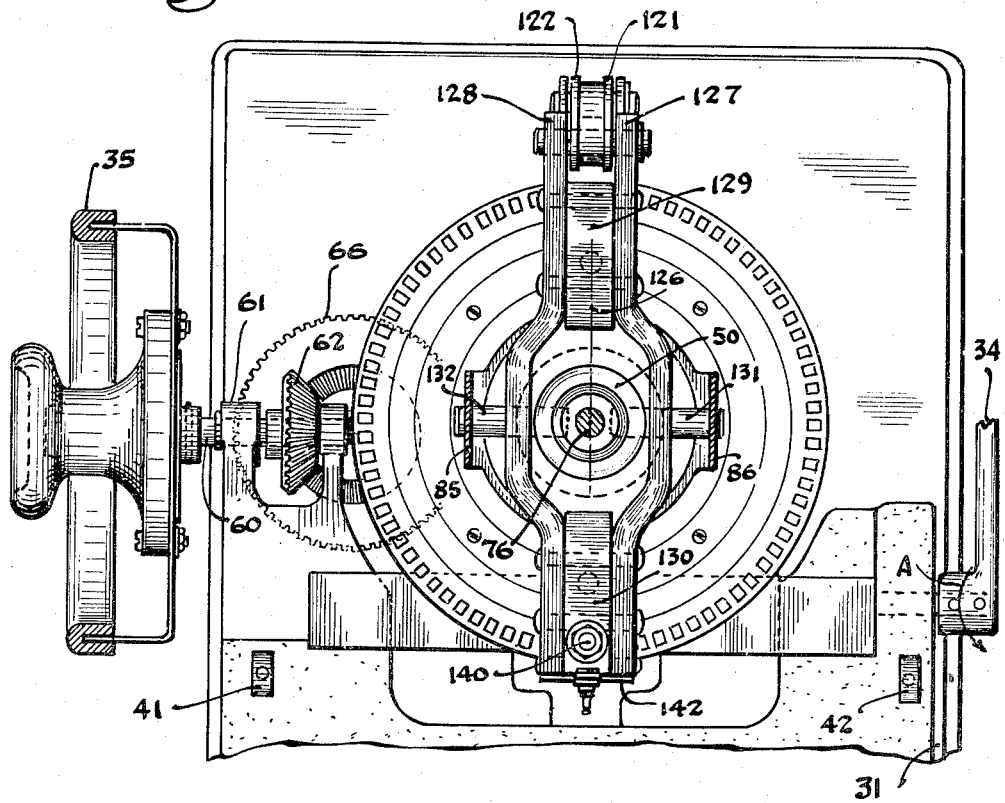
Fig. 5 is a sectional plan view of the embossing machine taken above the die heads.

The character selection hand wheel 35 of the embossing machine 30 is affixed to a shaft 60 which is journaled in an extension portion 61 of the base 31 of the machine, as indicated in each of Figs. 4, 5 and 7. A bevel gear 62 is suitably affixed to the end of shaft 60 opposite hand wheel 35 in position for meshing engagement with a second bevel gear 63. The bevel gear 63 is affixed to a vertical shaft 64 which, as shown in Figs. 7, is supported by an extension portion 65 of the base of the machine, the shaft extending downwardly through extension 65. A pair of spur gears 66 and 67 are affixed to shaft 64 for rotation therewith, gear 66 being located immediately beneath the bevel gear 63 and spur gear 67 being located at the opposite end of the shaft 64.

The upper spur gear 66 is in mesh with a driven spur gear 68 which, as indicated in Fig. 3, is affixed to the die head 54 as by a plurality of bolts or other suitable means. The driven gear 68 is also secured to a centering spindle 69 having a plurality of V-shaped slots or indentations 70 formed in the periphery thereof at locations accurately indexed to correspond to locations of the individual punch and die members 55 and 56 in the die head of the embossing machine. The centering spindle member 69 forms the lowermost element of the rotary die head assembly and is supported upon a thrust bearing 72 which encompasses the mounting post 50, thereby permitting rotary motion of the complete die head assembly with respect to the mounting post.

The lower spur gear 67, on the other hand, is in mesh with a driven spur gear 75 which is affixed to and supported by a shaft 76 which extends through the central aperture 77 in the cylindrical mounting post 50. The shaft 76 is rotatably supported within the mounting post 50 by means of an upper thrust bearing 78 and a lower journal bearing 79. Preferably, the two driving gears 66 and 67 are of similar size and configuration and the two driven gears 68 and 75 are similar to each other in size and configuration so that the shaft 76 is always rotated concurrently with and at the same speed as the die head 54. In other words, any angular displacement of the die head results in an exactly corresponding angular displacement of the shaft 76.

A bushing 80 is affixed to the upper end of the shaft 76 and, in turn, is mechanically connected to a pivotal connecting linkage 81 which extends through a stationary base plate 82 and is utilized to support a character indicator or pointer 83. Because the base plate 82 is stationary and is inclined with respect to the axis of shaft 76, it is necessary to utilize a coupling 81 which permits pivotal displacement of the indicator 83 from the horizontal position, yet maintains the indicator in fixed angular orientation with respect to the shaft as the shaft is rotated. A suitable journal bearing is preferably provided for the portion of the connecting linkage 81 which supports the indicator 83 as indicated in Fig. 3 at 84. Of course, the pointer 83 could be affixed directly to the upper end of the shaft 76 if the base plate 82 were disposed in a horizontal plane, but the inclined arrangement illustrated is usually more convenient for the machine operator.

The base plate 82 is bolted or otherwise suitably affixed to a pair of brackets 85 and 86 which are supported upon the central mounting post 50 of the embossing machine. The base plate 82 is located immediately beneath a suitable opening 88 in the cover 40 of the embossing machine and is utilized to support an index member 89 which extends up through the opening 88. The index member 89, in conjunction with the pointer 83, comprise the character indicator 39 of the machine (see Figs. 1 and 2). The index plate 89 is preferably formed from a clear transparent material such as a suitable plastic and the major portion of the area of the plate is rendered opaque as by the application of paint or by other suitable means. An annular sector 90 of the indicator plate 89, however, is left transparent in order that a portion of the pointer 83 may be viewed therethrough. Preferably, the pointer 83 is provided with an index line on the portion thereof underlying the transparent sector 90 of plate 89; alternatively, this portion of the pointer may be made relatively narrow in cross sectional area. A series of type character indication marks are printed or otherwise applied to the index plate 89 around the periphery of the transparent sector 90 of the plate to afford a means for identifying the particular punches and dies instantaneously located in the embossing position in the machine. In the preferred embodiment shown in the drawings, some of these character markings 94 are disposed around the outside of the window or transparent sector 90, whereas other markings 95 are disposed around the inner edge of the character indicator window.

In operation, rotational movement of the hand wheel 35 simultaneously selects the desired punch and die combination and affords an indication thereof enabling the operator of the machine to know just when the selected punch and die are in position for an embossing operation. Thus, rotation of the hand wheel, through the rotary driving linkage is afforded by gears 62, 63, 66 and 68, is effective to rotate the die head structure to bring a selected punch 55A and the corresponding die 56A in the punch and die heads 32 and 33 to the embossing position as indicated in Fig. 3. At the same time, the substantially independent indicator drive means afforded by gears 67 and 75 rotates the indicator shaft 76 through an angular displacement equal to that of the punch and die head and thus moves the indicator element 83 to the one of markings 94 and 95 which corresponds to the type character represented by the punch and die combination 55—56A. The machine operator always has a clear and unequivocal view of the character which is to be embossed, free of interference from any of the operating parts of the machine. This is a distinct advantage in the machine as compared with many previously known devices, in that it greatly facilitates speed and accuracy in the embossing operation. Moreover, the use of an independent drive for the indicator shaft avoids any interference between the indicator and the punch and die actuating mechanisms of the machine. The indicator and the die head are accurately indexed with respect to each other by the co-ordinated though independent driving arrangements provided by gears 66, 67, 68 and 75 and, once the indicator has been adjusted for accurate indication of one punch and die combination, there is virtually no possibility that the indicator will be rendered inaccurate in its identification of the punch and die combinations as they are moved into the embossing station of the machine.

*Die actuation mechanism*

The die actuation mechanism of the embossing machine 30 is illustrated in several views comprising Figs. 3–5 and 7–10. As indicated therein, the operating handle 34 of the embossing machine is affixed to an operating shaft 100 which is suitably journaled in a portion of the machine base 31. A mutilated gear 101 is also affixed to shaft 100 for rotation therewith and is in mesh with a second mutilated gear 102 which is pinned or otherwise affixed to a principal drive shaft 103. The drive shaft 103 is journalled in the base 31 of the machine. A pair of cams 105 and 106 are also affixed to the drive shaft 103 and are thus connected to the driven gear 102 for rotation therewith.

The cam 105 is provided with an internal cam track 107. This cam track 107 is engaged by a roller-type cam follower 108 which is affixed to and supported by a bell crank 109, the bell crank being journalled upon a stationary stub shaft 110 which is mounted upon the base of the machine. A biasing spring 111 is connected between the bell crank 109 and the base of the machine, being connected to an upwardly extending portion 112 of the base. The end of the bell crank arm to which the spring 111 is secured is pivotally connected to a drive link 113; preferably, the drive link 113 is made adjustable in length as indicated in Fig. 9. The other end of the link 113 is pivotally connected to a lever 114 which is affixed to a shaft 115 for rotation therewith. Shaft 115 extends across the back of the embossing machine and is journalled in the three vertical extension portions 112, 117 and 118 of the machine base, as best shown in Fig. 7. A pair of drive links 119 and 120 are affixed to the shaft for rotation therewith, being secured to the portion of the shaft immediately behind the center line 126 of the machine. The drive links 119 and 120, in turn, are pivotally connected to a further pair of drive links 121 and 122 by the connecting pin 123, the links 121 and 122 being separated by a spacer bushing 124. The ends of the drive links 121 and 122 opposite the pivot pin 123 are pivotally connected to a pair of die anvil support members 127 and 128. Thus, the drive links 119, 120, 121, and 122, with pin 123 and bushing 124, comprise a toggle mechanism connected to the die anvil support members 127 and 128.

The construction of the die anvil support members 127 and 128 is best indicated in Figs. 5, 7 and 9. As shown therein, the two members 127 and 128 are affixed to each other, being held in fixed relationship by suitable means such as a pair of spacer blocks 129 and 130. The composite support member thus formed is pivotally supported upon a pair of stationary shafts 131 and 132; as indicated in Fig. 5, the shaft 131 is supported by the center post 50 and the bracket 86, whereas the shaft 132 extends between the center post 50 and the other bracket 85. A die engaging pressure member 140 is secured to the front end of the spacer block or die anvil 130 and extends downwardly therefrom toward the particular die which is located in the embossing station of the machine as indicated in Figs. 3 and 9. In addition, a die restoration member 142 is secured to the front end of the spacer block 130 and extends downwardly into engagement with a notch 143 in the particular die 56A located in the embossing station of the machine. This die restoration member 142 is supported upon a pin 144 which extends through the die restoration member and is threaded into or otherwise secured to the die anvil 130. A torsion spring 146 is mounted upon the pin 144 to bias the member 142 toward engagement with the die head of the machine; preferably, a second biasing spring 147 inter-connecting pin 144 and the die restoration member is also provided.

The complete operation of the die actuation mechanism is carried out simply by rotation of the operating handle 34 through an arc of the order of 120° in the direction indicated in the various figures by arrow A and subsequent return movement of the operating handle to its initial or normal position. As indicated in Fig. 10, the counter-clockwise rotation of the operating handle also drives gear 101 counter-clockwise and rotates the mutilated gear 102 in a clockwise direction, as indicated by arrow B. Since the gear 102 and the cam 105 are both affixed to the drive shaft 103, this clockwise rotation of the gear 102 also rotates gear 105 in a clockwise direction as indicated in Fig. 9. Rotation of the cam 105, at the outset of the embossing operation, pivots the bell crank 109 coupled to the cam follower 108 through a relatively short distance in a clockwise direction as seen in Fig. 9. This relatively short movement of the bell crank in a clockwise direction is immediately followed by a substantially larger rotational movement in a counter-clockwise direction. Counter-clockwise rotation of the bell crank 109, in turn, impels the connecting link 113 toward the front of the machine and pivots the drive link 114 in a counter-clockwise direction, thereby also rotating the shaft 115 in a counter-clockwise direction. This rotational movement of the shaft 115 drives the composite die anvil support member 127, 128 upwardly by means of the toggle comprising members 119—120. Consequently, the forward end of the die anvil structure is driven downwardly, bringing the die-engaging member 140 into contact with the particular die 56A presently located at the embossing station of the machine. The die is forced downwardly into contact with a metal or plastic plate 150 located in the embossing station of the machine and at the same time forces the resiliently-mounted die restoration member 142 out of the slot 143 in the die.

After the embossing movement is completed, the operating handle 34 is rotated in a direction opposite to that indicated by arrows A to restore the die actuation linkage to its initial position. Each of the various drive members moves in a direction opposite to that indicated hereinabove, returning the linkage to the position shown in the drawings. As the cam 105 nears the end of its return movement, it impels the bell crank 109 linked thereto by the cam follower 108 beyond the initial or normal position, thereby elevating the back end of the die anvil support 127, 128 slightly above the normal position shown in Figs. 3 and 9. As the mechanism moves toward this position, the die restoration finger 142 re-engages in the slot 143 of the die 56A; consequently, the overtravel of the die actuation system in its return movement affords a positive restoration movement to the die assuring its return to a normal position in which it is completely out of contact with the plate 150.

*Punch actuation mechanism*

The mechanical driving linkages and other elements of the punch actuation mechanism for embossing machine 30 are illustrated in the several views of Figs. 3, 4 and 8–14. The initial portion of this mechanism is common to the die actuation mechanism; that is, the actuation of the punches in embossing machine 30 is effected and controlled by the operation of handle 34 and the initial driving linkage comprising the gears 101 and 102 (see Figs. 9 and 10).

As best shown in Figs. 12–14, a pair of eccentrics 200 and 201 are affixed to the rock shaft 103 for rotational movement therewith. A connecting rod 202 is journaled on the eccentric 200; the end of the connecting rod 202 opposite shaft 103 carries a pair of drive rollers 203 and 204. Roller 203 engages another roller 205 which is supported upon connecting rod 202 and pivotally connected to a pair of levers 206, the levers 206 in turn being pivotally supported from a punch anvil 207 by means of a pivot pin 208 affixed to the punch anvil. Similarly, pressure roller 204 engages another roller 210 which is pivotally supported on rod 202 and connected to a pair of levers 211; the levers 211, however, are pivotally mounted upon a shaft 212 affixed to the base 31 of the printing machine. Thus, the rollers 205 and 210, together with levers 206 and 211, comprise a toggle mechanism coupling the tie rod 202 to the punch anvil 207.

Eccentric 201 is connected to the punch anvil 207 in essentially the same manner as anvil 200. Thus, the connecting rod 214 is journaled upon the eccentric 201 and carries a pair of pressure rollers which engage corresponding pairs of pressure rollers forming part of a toggle mechanism pivotally connected to the punch anvil 207 and to the frame of the machine. The shafts for the pressure rollers on this side of the machine are the shaft 216, which is affixed to anvil 207, and the shaft 217 affixed to the frame 31.

The punch anvil 207 is utilized to support and to drive a punch-engaging pressure member 220. As indicated in Fig. 3, the pressure member 220 is threaded into or otherwise affixed to a bushing 221 which is slidably supported in the upper portion of the punch anvil. A second guide bushing 222 is also affixed to the pressure member 220 and extends through the lower portion of the punch anvil 207. A torsion spring 223 is mounted within the central portion of the anvil 207 in encompassing relation to the lower guide bushing 222 and in engagement with a suitable shoulder 224 on the upper guide bushing 221 and with a second shoulder 225 on the punch anvil.

A punch restoration member 230 is also supported by the punch anvil 207; the restoration member 230 extends upwardly from the punch anvil into engagement with a notch 231 in the particular punch 55A which is located in the embossing station of the machine (see Fig. 3). The punch restoration member 230 is supported by means of a pair of pins 233 and 234 affixed to the punch anvil, the pin 233 being connected to a pin 235 on the punch restoration member 230 by means of a spring 236. The punch restoration member is also provided with a positioning set screw 238 which is threaded into the lower portion of the punch restoration member and which engages the mounting pin 234.

The operating mechanism for the punches and dies of the embossing machine 30 also includes an indexing mechanism which may be considered as comprising a part of both the punch and die actuation mechanisms. The indexing mechanism includes the cam 106 which, as described above, is affixed to rock shaft 103 for rotation therewith and which is engaged by a cam follower 240 mounted upon one arm of a bell crank 241. The bell crank 241 is journaled upon the shaft 110 and the end of the bell crank opposite cam follower 240 is connected to the frame of the machine by a biasing spring 242. The bell crank 241 is further connected to one extension portion 243 of an operating lever 244 by means of a resilient adjustable-length connection device 245. The operating lever 244 is affixed to and supported by a rock shaft 246 journaled in the frame of the machine. A further extension portion 247 extends from the lever 244 in a direction away from extension 243 and into position to engage a stop member 248 affixed to the cam 106. The operating lever 244 is also provided with a third extension 250 to which a tie rod 252 is connected; the tie rod 252 forms a part of the carriage-operating mechanism of the embossing machine as will be explained more fully hereinafter.

The rock shaft 246 is utilized to support and to drive an indexing member 254 which is best shown in Figs. 3 and 4. The indexing member 254 includes a wedge-shaped forwardly projecting portion having a configuration such that the index member may engage in the individual slots 70 in the indexing spindle 69 of the embossing machine die head.

As indicated hereinabove, the operation of the punch actuation mechanism is actuated and controlled by rotation of the handle 34 through a relatively small arc and takes place coincidentally with operation of the die actuation mechanism. Thus, counter-clockwise rotation of the operating handle 34, as indicated by arrows A, causes the gear 101 to drive gear 102 in a clockwise direction, thereby rotating the rock shaft 103 in a clockwise direction as indicated by arrow B in Figs. 10–13.

As best seen in Fig. 13, the clockwise rotation of drive shaft 103 and the resultant clockwise rotation of eccentric 200 drives the tie rod 202 to the left, as seen in this figure. This movement of the connecting rod 202 causes the rollers 203 and 204 to force the mating rollers 205 and 210 to the left. Because rollers 205 and 210 are engaged with each other as well as with the toggle drive rollers 203 and 204, and since the fulcrum point for the levers 211 connected to roller 210 is fixed with respect to the frame of the machine, the toggle mechanism is driven to the position shown in dash lines in Fig. 13, the support pin 208 being driven upwardly to the position 208A. The same driving action, of course, is simultaneously applied to the toggle mechanism on the opposite side of punch anvil 207 by means of the linkage comprising eccentric 201 and the connecting rod 214. Thus, the punch anvil 207 is driven upwardly and into engagement with the particular punch 55A located at the embossing station of the machine, driving the punch upwardly toward engagement with the plate or card 150 being embossed.

When the pressure member 220 engages the punch 55A, the punch is driven toward the die 56A (see Fig. 3) and a character impression determined by the configuration of the punch and die is embossed in the plate 150. During the embossing operation, the spring 223 is compressed, since the pressure member 220 moves to a certain extent with respect to the punch anvil 207. When the anvil 207 is subsequently returned to its normal position as shown in Figs. 3 and 14, the spring expands to return the pressure member 220 to its initial position.

As in the case of the die actuation mechanism, the return movement of handle 34 in a direction opposite arrow A restores the complete linkage of the punch actuation mechanism to its initial position. Thus, clockwise rotation of the handle rotates gear 101 to drive the mating gear 102 in a counter-clockwise direction and thereby rotates the two eccentrics 200 and 201 in a direction opposite that indicated by arrows B in Figs. 12 and 13. This rotational movement of the eccentrics restores the connecting rods 202 and 214 to their initial position and pulls the toggle linkage connecting the tie rods to the punch anvil back to the position shown in solid lines in Fig. 13. Accordingly, as soon as the operating handle 34 has been returned to its starting position, the punch actuation mechanism is conditioned for another embossing operation.

The indexing mechanism actuated by cam 106 is utilized to assure accurate indexing of the die head 54 and to prevent damage to the die head which might result if the embossing machine were actuated through an embossing operation with the die head mis-aligned with respect to the embossing position of the machine. Thus, in the initial part of the embossing operation the cam follower 240 which engages cam 106 drives the lever 241, rotating the lever in a counter-clockwise direction as seen in Figs. 9 and 9A. This counter-clockwise movement of the lever 241 against the biasing effect afforded by the spring 242 imparts a corresponding counter-clockwise rotational movement to the lever 244 and consequently rotates the rock shaft 246 to which lever 244 is affixed in a counter-clockwise direction. This counter-clockwise rotation of shaft 246 impels the indexing member 254 toward engagement with the indexing spindle 69 of the die head, as indicated in Figs. 3 and 4.

In most instances, the indexing member 254 is sufficiently well aligned with one of the slots 70 in the indexing spindle 69 so that the member 254 moves completely into the slot, permitting rotation of the rock shaft 246 to an extent sufficient to spring the extension 247 of lever 244 clear of the stop member 248 on the cam 106 (see Fig. 9A). Preferably, the configuration of slots 70 is made complementary to the wedge-shaped configuration of the indexing member 254 in order that the indexing member may accurately align the die head with respect to the embossing station of the machine and thus automatically correct for any minor errors in the operator's alignment of the embossing machine. In the event, however, that the operator attempts to effect an embossure with the die head aligned exactly intermediate two punch and die combinations, the indexing member 254 engages one of the projections on the spindle 69 and is prevented from completing its forward movement.

If the indexing member 254 is blocked in this manner, its forward movement is arrested and continued rotational movement of the rock shaft 246 is prevented. When this occurs, the extension 247 of the lever 244 (Fig. 9A) engages the stop member 248 on cam 106 and locks up the punch and die actuation mechanisms by preventing continued rotation of the principal drive shaft 103 to which the cam 106 is affixed. This safety device thus prevents improper operation of the embossing machine due to mis-alignment of the die head 54 with respect to the embossing station of the machine.

*Carriage and carriage drive mechanism*

The carriage and carriage drive mechanism of the embossing machine 30 are most clearly illustrated in Figs. 3, 4, 11 and 15–23 of the drawings. Thus, as indicated in the sectional view of Fig. 3, the front part of the embossing machine 30 includes a pair of guide rails 270 and 271 which are affixed to and supported by the frame of the embossing machine. These two guide rails are utilized to guide transverse movement of a first carriage member 272 with respect to the machine. The carriage member 272, in turn, supports a second carriage member 273 which is mounted upon the carriage member 272 for movement with respect thereto to facilitate movement of the workholder 36 toward and away from the die head of the embossing machine. Movement of the carriage member 272 is utilized to effect character-spacing movement of the plate or other member 150 being embossed whereas movement of the second carriage member 273 affords a means for line-spacing movement of the plate 150.

The lower portion of carriage member 272 has affixed thereto a pair of racks 275 and 276 which are engaged respectively by two driving pinions 277 and 278. The pinions 277 and 278 are both affixed to a main carriage drive shaft 279 which is journaled in the frame 31 of the embossing machine. A torsion spring 280 is mounted in encompassing relation to the shaft 279; one end of the torsion spring 280 is affixed to a collar 281 mounted on the frame of the machine and supported in encompassing relation to the shaft 279, the other end of the spring being connected to the shaft 279. The torsion spring is so arranged with respect to the shaft 279 and the frame of the embossing machine that it biases the shaft 279 to clockwise rotation as viewed from the front end of the machine and therefore tends to maintain the carriage member 272 at the right hand side of the machine as viewed from the front thereof.

A character-spacing escapement mechanism is included in the embossing machine 30 and comprises a ratchet or escapement wheel 283 which is affixed to shaft 279 at the forward portion thereof. As shown in Fig. 16, the ratchet 283 may be engaged by any one of three different pawls 284, 285 and 286. Pawls 284 and 285 are both pivotally supported upon a connecting link 289 (Fig. 15) and are normally maintained in the positions shown in Fig. 16 by means of the biasing springs 290 and 291. The connecting link 289, as indicated in Fig. 15, is supported for limited longitudinal movement with respect to the frame of the embossing machine; one end of the link 289 is connected to the frame of the machine by a biasing spring 292, whereas the other end of the link is connected to a bell crank 293. Bell crank 293, as best indicated in Figs. 4 and 11 is supported from the frame of the machine for pivotal movement in a horizontal plane and the end of the bell crank opposite that connected to link 289 is connected to the tie rod 252. The tie rod 252 extends from the bell crank 293 backwardly through the machine and is connected to the projection 250 of the lever 244.

The carriage release mechanism of the embossing machine, which is operated from the control button 41, includes a vertical connecting rod 296 biased to its normal or retracted position (see Fig. 19) by a spring 295; one end of tie rod 296 supports the control button 41 and the other end is connected to a pivotal link 297. Link 297, in turn, is supported upon and affixed to a rock shaft 298 which extends forwardly beneath the carriage-supporting portion of the embossing machine and which is supported in the frame 31 of the machine. A lever 300 is affixed to the other end of the rock shaft 298 for rotational movement therewith, the end of lever 300 opposite the rock shaft being pivotally connected to a tie rod 301 (Fig. 15) which extends across the front of the embossing machine and which is pivotally connected at its opposite end to a lever 302. The other end of the lever 302 is journaled on the carriage drive shaft 279, thereby limiting the lever to pivotal movement with respect to the carriage drive shaft. The lever 302, as shown in Figs. 16 and 17, includes a cam portion 303 for engaging the pawl 284 when the lever is pivoted in a counter-clockwise direction with respect to shaft 279; the lever 302 further includes a second cam portion 304 adapted to engage the pawl 286 to prevent engagement of the pawl with the ratchet wheel 283.

The back space control button 42 of the embossing machine is mounted upon a vertically extending tie rod 306 and is biased toward its normal or unactuated position by a spring 305 (Fig. 15), the other end of the rod 306 being connected to a pivotal connecting link 307 which is supported and affixed to a rock shaft 308. The other end of the rock shaft 308 is connected to a pivotal link 309 which extends across the front of the machine toward the ratchet 283. The end of link 309 opposite the rock shaft 308 engages a pin 310 upon a further link 311 which is journaled upon the character-spacing drive shaft 279, as best indicated in Fig. 18. In addition, and as also shown in Fig. 18, the link 311 comprises the supporting member for the pawl 286, which is pivotally supported upon the link 311 and which is biased toward engagement with the ratchet 283 by means of a biasing spring 313.

Figs. 20–23 illustrate the line-spacing mechanism of the carriage 37, and should be considered in connection with Fig. 3. As indicated in Fig. 3, the second carriage member 273 includes at least one rack 320, which is engaged by a pinion 322 affixed to a line-spacing drive shaft 323. Preferably, a dual rack and pinion drive is employed, essentially similar to that described for character-spacing movement. As indicated in Fig. 22, the shaft 323, which is journaled in the first carriage member 272, also supports a line spacing ratchet wheel 324 positioned to be engaged by a line-space actuating pawl 325 and a holding pawl 326; ratchet 324 and pawls 325 and 326 comprise the line-space mechanism of the machine.

The line spacing pawl 325 is pivotally mounted upon a lever 330, the lever 330 being journaled upon the shaft 323 as best shown in Fig. 23. The pawl is engaged by a connecting link 331 which is affixed to a line space actuation shaft 333 for rotation therewith; the shaft 333 is journaled in and extends vertically upward through a portion of the first carriage member 272. The line space actuating lever 45 is pinned or otherwise affixed to the upper end of the shaft 333. The pawl 325 is biased toward engagement with the ratchet wheel 324 by a spring 334 as indicated in Fig. 22.

The line space carriage release lever 46 is journaled on the shaft 333 for pivotal movement with respect thereto; lever 46 is in the form of a bell crank having an extension portion 336 (see Fig. 20) which engages a projection 337 of a line space carriage release lever 338. The line space carriage release lever 338 is journaled upon the shaft 323 and includes a pair of cam portions 339 and 340 (Fig. 22) which are adapted to engage the pawls 325 and 326 respectively. Pawl 326, which comprises the holding element of the ratchet device, is pivotally mounted upon the carriage member 272 and is biased toward engagement with the ratchet wheel 324 by means of a spring 342.

The indexing carriage advancing lever 44 of the embossing machine carriage is shown in enlarged detail in Fig. 21; as indicated therein, the lever 44 is of substantially L-shaped configuration and is slidably supported upon the second carriage member 273. In Fig. 21, the lever is shown in its actuated position in which it has been moved forwardly and downwardly with respect to the carriage member 273, against the bias afforded by a spring 350, into engagement with a stop member 352 supported upon the first carriage member 272.

The work holder 36 of the embossing machine is essentially conventional in construction and operation and consequently will not be described in detail herein. As illustrated in Fig. 3, the work holder 36 includes a base member 360 which is mounted upon the upper carriage member 273. The base member 360 is utilized to support a shaft 361 to which an operating handle 362 is affixed. The workholder further includes a pair of jaw members 363 and 364; the lower jaw member 363 may be affixed to the shaft 361 for rotation therewith and the jaw member 364 may be spring biased toward contact with the jaw member 363 in the usual manner, the biasing arrangement not being shown in the drawings.

The embossing machine further includes a carriage line indexing device comprising an indexing member 370 which is affixed to the base 31 of the embossing machine and which extends between carriage members 272 and 273 as best indicated in Fig. 3. Referring to Fig. 20, it is seen that the indexing member 370 overlies a carriage position scale 372 which may comprise a card, embossed plate, or other similar device with scale markings thereon, the scale 372 being affixed to the carriage member 272. The scale markings on member 372 indicate the line and character positioning of the carriage with respect to the base of the machine and thus afford a means for readily identifying the position upon a plate or other device 150 in which the embossed character will be formed.

Operation of the carriage and carriage drive of the embossing machine is extremely simple from the standpoint of skill required of the operator. Thus, each time the operating handle 34 of the embossing machine is rotated in a counterclockwise direction to perform an embossing operation, the lever 244 (Fig. 11) is driven in a counter-clockwise direction as described hereinabove and pulls the tie rod 252 toward the rear of the embossing machine. This rearward movement of the tie rod 252 rotates the bell crank 293 (Fig. 4) in a counterclockwise direction and pulls the connecting link 289 to the right as seen in Figs. 4 and 15. The effect of this movement of the connecting link 289 on the character-spacing escapement is best seen in Fig. 16; as indicated therein, movement of the connecting link 289 to the right displaces the pawls 284 and 285 to their alternate positions 284A and 285A, releasing pawl 284 from engagement with the escapement wheel 283 and at the same time bringing the pawl 285 into engagement with the escapement wheel. This permits the ratchet wheel and the shaft 279 to which it is affixed to rotate in a clockwise direction through an arc equivalent to one half of a character spacing interval, the impetus for this movement being afforded by the torsion spring 280. The two pawls 277 and 278 affixed to shaft 279 thus drive the carriage one half character space to the right of the machine.

When the operating handle 34 is returned to its normal position, the linkage comprising lever 244, tie rod 252, bell crank 293 and link 289 is returned to its original condition, thereby shifting the pawls 284 and 285 back toward their initial positions as shown in solid lines in Fig. 16. When this is done, shaft 279 again rotates in a clockwise direction through an interval equivalent to one half character space before it is arrested by the pawl 284, thereby completing the character spacing operation of the machine. It should be noted that operation of the linkage interconnecting the operating handle 34 and the character space drive mechanism of the embossing machine takes place at the beginning of the embossing operation and at the end of that operation; consequently, it is possible to effect a character-spacing movement of the carriage without performing an embossing operation simply by rotating the operating handle 34 through a relatively small arc of the order of 10° to 15° and returning it to its original position without completing movement of the handle through the larger arc required for an embossing operation.

Back spacing of the carriage is an equally simple operation from the standpoint of the operator. Depression of the back space control button 42 impels the tie rod 306 downwardly (see Fig. 15) and thereby rotates the link 307 in a clockwise direction, thus rotating the rock shaft 308 in a clockwise direction. This rotational movement of the rock shaft causes the connecting link 309 to pivot in a clockwise direction with respect to the shaft and thereby causes the link 311 to rotate about shaft 279 from its initial position as shown in Fig. 16 to its actuated position as illustrated in Fig. 18. The counter-clockwise rotation of the link 311 brings pawl 286 into engagement with the ratchet wheel 283 and drives the escapement wheel in a counter-clockwise direction through an arc sufficient to displace the holding pawl 284 from engagement with one tooth of the ratchet wheel to the next subsequent tooth thereof. In this manner, back spacing of the carriage is effected simply by the operator pushing upon the control button 42. As soon as the control button is released, of course, the back space drive linkage returns to its original position in response to the biasing force exerted by the spring 305, the pawl 286 being freed from engagement with the ratchet wheel as the link 311 returns the pawl to its original position in engagement with the cam surface 304 of the lever 302 (see Fig. 16).

When it is desired to move the carriage completely to the right of the machine, as when a new plate is to be inserted in the carriage workholder or when a character is to be embossed at the extreme left hand edge of the plate, the requisite carriage movement is accomplished simply by depressing the control button 41. As the control button 41 moves downwardly against the biasing force afforded by the spring 295 (see Figs. 15 and 19) the tie rod 296 to which the button is affixed causes the link 297 to rotate and thereby rotates rock shaft 298 in a counter clockwise direction as seen in Fig. 15. This rotational movement of the rock shaft and lever 300 connected thereto impels the tie rod 301 to the right and drives the cam lever 302 from its initial or unactuated position as seen in Fig. 16 to the actuated position shown in Fig. 17. This movement of the cam lever 302 causes the cam surfaces 303 to engage the escapement holding pawl 284 and pivot the pawl away from engagement with the escapement wheel. At the same time, the cam surface 304 maintains the pawl 286 in its disengaged position and the third pawl 285 is also left disengaged from the ratchet wheel. Consequently, the torsion spring 280 rotates the character spacing drive shaft 279 and drives the carriage to the extreme right of the embossing machine as viewed from the front thereof.

Operation of the line spacing control elements of the embossing machine is accomplished by means of the three control levers 44, 45 and 46. Thus, after a plate or other device 150 to be embossed is first mounted in the workholder 36, and the workholder is rotated to its operative position by means of the lever 362 (Fig. 3) the operator of the machine presses against the line space indexing lever 44 in the direction indicated in Fig. 21 by arrow D. This effectively moves the carriage member 273 forwardly and brings the plate 150 over the guide plate 400 of the embossing machine. The movement of the line spacing carriage member 273 is arrested by engagement of the lever 44 with the stop 352, which effectively halts the inward movement of the carriage at a position corresponding to the first line of embossure. As soon as the operator releases the lever 44, it is returned by the spring 350 to its initial or unactuated position, freeing the lever from engagement with the stop 352 and permitting subsequent further movement of the carriage into the embossing machine.

When it is desired to advance the embossing machine carriage in order to permit embossure of a second line of type or other characters, the line spacing control lever 45 is moved in a clockwise direction as seen in Fig. 20. This clockwise movement of the line spacing control lever causes the connecting link 331 to pivot in a clockwise direction and thus rotates the line space pawl 325 in a clockwise direction with respect to the shaft 323 (see Figs. 22 and 23). The clockwise movement of the pawl 325 causes the pawl to engage the line space wheel 324 and to rotate the wheel and the shaft 323 to which it is affixed through a clockwise arc equivalent to one line space. This rotation of the shaft 323 drives the carriage inwardly with respect to the die head of the machine by means of the rack and pinion drive connecting the shaft to the carriage member 273. When the line space lever 45 is released, it returns to its original position in response to the biasing effect afforded by a spring 401; the holding pawl 326 prevents counter-clockwise movement of the wheel 324 and thereby retains the carriage in its advanced position. This is of course repeated by the operator for each desired line spacing movement of the carriage.

After the plate 150 has been completely embossed with the desired characters, it is necessary to retract the carriage completely in order to remove the plate from the workholder 36. For this purpose, the operator simply rotates the carriage release lever 46 in a clockwise direction as seen in Fig. 20. The clockwise rotation of the carriage release lever pivots the link 336 in a clockwise direction and thereby rotates the lever 338 connected thereto in a counter-clockwise direction with respect to shaft 323. This counter-clockwise rotation of the lever 338 brings the cam surface 340 into engagement with the holding pawl 326 and displaces the pawl from its normal engagement with the ratchet wheel 324. When the ratchet wheel and holding pawl 326 are disengaged the torsion spring 321 drives the shaft 323 in a counter-clockwise direction and impels the upper or line spacing carriage member 273 to its retracted position, thereby retracting the plate 150 completely from the die head of the embossing machine. In its retracted position, of course, the workholder 36 may be actuated in the usual manner to release the plate 150 and thereby permit insertion of another plate or device to be embossed in the workholder. The instantaneous line and character spacing positions of the carriage members are at all times indicated by the indexing member 370 and the scale 372.

Hence, while we have illustrated and described the preferred embodiment of our invention, it is to be understood that this is capable of variation and modification, and we therefore do not wish to be limited to the precise details set forth, but desire to avail ourselves of such changes and alterations as fall within the purview of the following claims.

We claim:

1. An embossing machine comprising: a rotary die head having a plurality of dies and punches mounted therein in opposed relation; manually operable drive means, connected to said die head, for rotating said die head to bring any desired punch and die into operative position at an embossing station; an indicator shaft extending coaxially of said die head; independent drive means connecting said first-mentioned drive means in mechanical driving relation to the indicator shaft to rotate said indicator shaft conjointly with said die head; and an indicator device, connected to said indicator shaft, for identifying the particular punch and die elements instantaneously located at the embossing station.

2. An embossing machine comprising: a stationary cylindrical mounting member; a rotary die head journalled on said mounting member and having a plurality of dies and punches mounted therein in opposed relation; manually operable drive means, connected to said die head, for rotating said die head to bring any desired punch and die into operative position, at an embossing station; an indicator shaft extending through said mounting member coaxially of said die head; independent drive means connecting said first-mentioned drive means in mechanical driving relation to the indicator shaft to rotate said indicator shaft conjointly with said die head; and an indicator device, connected to said indicator shaft, for identifying the particular punch and die elements instantaneously located at the embossing station.

3. An embossing machine comprising: a rotary die head having a plurality of dies and punches mounted therein in opposed relation; manually operable drive means, including a selector shaft and a first gear train coupling said shaft to said die head in mechanical driving relationship, for rotating said die head to bring any desired punch and die into operative position at an embossing station; an indicator shaft extending coaxially of said die head; independent drive means including a second gear train connecting said selector shaft in mechanical driving relation to the indicator shaft to rotate said indicator shaft conjointly with said die head; and an indicator device, connected to said indicator shaft, for identifying the particular punch and die elements instantaneously located at the embossing station.

4. An embossing machine comprising: a stationary cylindrical mounting member; a rotary die head rotatably supported on the mounting meber in encompassing relation thereto, said die head having a plurality of dies and punches mounted therein in opposed relation; manually operable drive means, including a selector shaft, a first gear train coupling said selector shaft to said die head in mechanical driving relation, and an operating handle affixed to said selector shaft, for rotating said die head to bring any desired punch and die into operative position at an embossing station; an indicator shaft extending through the mounting member coaxially of said die head; independent drive means including a second gear train connecting said selector shaft in mechanical driving relation to said indicator shaft to rotate said indicator shaft conjointly with said die head; and an indicator device, mounted above the die head and connected to said indicator shaft, for identifying the particular punch and die elements instantaneously located at the embossing station.

5. In a manually operable embossing machine including a rotary die head having a plurality of punches and dies mounted therein in opposed relation with respect to each other and means for rotating said die head to bring any desired punch and die combination into operative position at an embossing station in the machine, an embossing drive mechanism comprising: a drive shaft; a vertically movable punch anvil; a punch actuating mechanism interconnecting the punch anvil and the drive shaft in mechanical driving relationship and comprising an eccentric affixed to said shaft, a tie rod driven by said eccentric, and a toggle mechanism coupling the tie rod to the punch anvil; a cam affixed to the drive shaft for rotation therewith; a pivotally mounted die anvil; a die actuating mechanism interconnecting the die anvil and the drive shaft in mechanical driving relationship and comprising a second toggle mechanism coupled to the die anvil and a cam follower lever interconnecting the cam and the second toggle mechanism; and an operating handle operatively connected to said drive shaft for rotating said drive shaft through a predetermined angular displacement to impel said anvils toward each other.

6. In a manually operable embossing machine a rotary die head having a plurality of punches and dies mounted therein in opposed relation with respect to each other and means for rotating said die head to bring any desired punch and die combination into operative position at an embossing station in the machine, an embossing drive mechanism comprising: a drive shaft; a vertically movable punch anvil; a punch actuating mechanism interconnecting the punch anvil and the drive shaft in mechanical driving relationship and comprising an eccentric affixed to said shaft, a tie rod driven by said eccentric, and a toggle mechanism coupling the tie rod to the punch anvil; a pivotally mounted die anvil; a die actuating toggle mechanism interconnecting the die anvil and the drive shaft in mechanical driving relationship; and an operating handle operatively connected to said drive shaft for rotating said drive shaft through a predetermined angular displacement to impel said anvils toward each other.

7. In a manually operable embossing machine including a rotary die head having a plurality of punches and dies mounted therein in opposed relation with respect to each other and means for rotating said die head to bring any desired punch and die combination into operative position at an embossing station in the machine, an embossing drive mechanism comprising: a drive shaft; a vertically movable punch anvil; a punch actuating toggle mechanism interconnecting the punch anvil and the drive shaft in mechanical driving relationship; a cam affixed to the drive shaft; a pivotally mounted die anvil; a die actuating mechanism interconnecting the die anvil and the drive shaft in mechanical driving relationship and comprising a second toggle mechanism coupled to the die anvil and a cam follower lever interconnecting the drive cam and the second toggle mechanism; and an operating handle operatively connected to said drive shaft for rotating said drive shaft through a predetermined angular displacement to impel said anvils toward each other.

8. An embossing machine comprising: a vertical stationary cylindrical mounting member; a rotary die head journalled on said mounting member; manually operable drive means for rotating said die head; an indicator shaft extending coaxially of said die head; independent drive means connecting said indicator shaft in mechanical driving relation to said drive means to rotate said indicator shaft conjointly with said die head; an indicator device, connected to said indicator shaft, for identifying the particular punch and die elements instantaneously located at an embossing station in the machine; a drive shaft; a vertically movable punch anvil; a punch actuating mechanism interconnecting the punch anvil and the drive shaft in mechanical driving relationship and comprising an eccentric affixed to said shaft, a tie rod driven by said eccentric, and a toggle mechanism coupling the tie rod to the punch anvil; a drive cam affixed to the drive shaft; a die anvil, pivotally mounted on said mounting member; a die actuating mechanism interconnecting the die anvil and the drive shaft in mechanical driving relationship and comprising a second toggle mechanism coupled to the die anvil and a cam follower lever interconnecting the drive cam and the second toggle mechanism; and an operating handle operatively connected to said drive shaft for rotating said drive shaft through a predetermined angular displacement to impel both said anvils toward the die head.

9. An embossing machine comprising: a vertical stationary cylindrical mounting member; a rotary die head journalled on said mounting member; manually operable drive means for rotating said die head; an indicator shaft extending coaxially of said die head; independent drive means connecting said indicator shaft in mechanical driving relation to said drive means to rotate said indicator shaft conjointly with said die head; an indicator device, connected to said indicator shaft, for identifying the particular punch and die elements instantaneously located at the embossing station; a drive shaft; a vertically movable punch anvil; a punch actuating mechanism interconnecting the punch anvil and the drive shaft in mechanical driving relationship; a drive cam affixed to the drive shaft; a die anvil, pivotally mounted on said mounting member; a die actuating mechanism interconnecting the die anvil and the drive shaft in mechanical driving relationship and comprising a second toggle mechanism coupled to the die anvil and a cam follower lever interconnecting the drive cam and the second toggle mechanism; and an operating handle operatively connected to said drive shaft for rotating said drive shaft through a predetermined angular displacement to impel both said anvils toward the die head.

10. An embossing machine comprising: a vertical stationary cylindrical mounting member; a rotary die head journalled on said mounting member; manually operable drive means for rotating said die head; an indicator shaft extending coaxially of said die head; independent drive means connecting said indicator shaft in mechanical driving relation to said drive means to rotate said indicator shaft conjointly with said die head; an indicator device, connected to said indicator shaft, for identifying the particular punch and die elements instantaneously located at an embossing station; a drive shaft; a vertically movable punch anvil; a punch actuating mechanism interconnecting the punch anvil and the drive shaft in mechanical driving relationship and comprising an eccentric affixed to said shaft, a tie rod driven by said eccentric, and a toggle mechanism coupling the tie rod to the punch anvil; a die anvil, pivotally mounted on said mounting member; a die actuating mechanism interconnecting the die anvil and the drive shaft in mechanical driving relationship; and an operating handle operatively connected to said drive shaft for rotating said drive shaft through a predetermined angular displacement to impel both said anvils toward the die head.

11. An embossing machine comprising: a vertical stationary cylindrical mounting member; a rotary die head journalled on said mounting member; manually operable drive means for rotating said die head; an indicator shaft extending coaxially of said die head; independent drive means connecting said indicator shaft in mechanical driving relation to said drive means to rotate said indicator shaft conjointly with said die head; an indicator device, connected to said indicator shaft, for identifying the particular punch and die elements instantaneously located at an embossing station; a drive shaft; a vertically movable punch anvil; a punch actuating mechanism interconnecting the punch anvil and the drive shaft in mechanical driving relationship and comprising an eccentric affixed to said shaft, a tie rod driven by said eccentric, and a toggle mechanism coupling the tie rod to the punch anvil; a drive cam affixed to the drive shaft; a die anvil, pivotally mounted on said mounting member; a die actuating mechanism interconnecting the die anvil and the drive shaft in mechanical driving relationship and comprising a second toggle mechanism coupled to the die anvil and a cam follower lever interconnecting the drive cam and the second toggle mechanism; an operating handle operatively connected to said drive shaft for rotating said drive shaft through a predetermined angular displacement to impel both said anvils toward the die head; and an indexing mechanism, including an indexing spindle affixed to the die head for rotation therewith and an index lever mechanically connected to said drive shaft and adapted to engage said spindle to prevent actuation of said punch and die actuating mechanisms with said die head mis-aligned with respect to the punch and die anvils.

12. In an embossing machine of the kind comprising a frame and drive means, including a drive shaft, for actuating a punch to emboss a work piece located at an embossing station in the machine, a work holder comprising: a first carriage member, supported on said frame for movement in a predetermined direction with respect to the embossing station and having a rack member affixed thereto; a carriage drive shaft journalled in said frame; a pinion affixed to said shaft for rotation therewith and supported in meshing engagement with the carriage rack member; a torsion spring mounted in encompassing relation to said shaft and having its opposite ends affixed to shaft and to said frame respectively, for biasing the carriage member in a predetermined direction with respect to the embossing machine; an escapement mechanism operatively connected to the carriage drive shaft for controlling rotational movement of that shaft; a drive linkage mechanically interconnecting the main drive shaft with the escapement mechanism for actuating the escapement each time the drive shaft is actuated to effect an embossure; a second carriage member supported on the first carriage member for movement transversely thereof and having a second rack member affixed thereto; a second carriage shaft journalled in the first carriage member; a second pinion affixed to the second carriage shaft in meshing engagement with the second rack member; a torsion spring mounted in encompassing relation to the second carriage shaft and having its opposite ends affixed to the second carriage shaft and to the first carriage member respectively, for biasing the second carriage member in a predetermined direction with respect to the first carriage member; and a second escapement mechanism operatively connected to the second carriage shaft for controlling angular movement thereof.

13. In an embossing machine of the kind comprising a frame and drive means for actuating a punch to emboss a work piece located at an embossing station in the machine, a carriage mechanism comprising: a carriage member supported on said frame for movement with respect to the embossing station; a carriage drive shaft; means connecting the drive shaft in mechanical driving relationship to the carriage member for moving the carriage member in response to angular displacement of the shaft; spring means for biasing the carriage toward movement in a given direction with respect to the embossing station; a ratchet wheel affixed to the drive shaft for rotation therewith; a pawl support member extending transversely of the ratchet wheel and supported from the frame for longitudinal movement with respect thereto; a pair of pawls mounted on the support member and extending toward engagement with the ratchet wheel; biasing means for normally maintaining one of said pawls in engagement with the ratchet wheel to prevent rotational movement of the shaft; and a drive linkage connecting the pawl support member to the punch drive means for moving the pawl support member longitudinally in response to actuation of said drive means to free said one pawl from engagement with the ratchet wheel and to bring the other pawl into engagement therewith.

14. In an embossing machine of the kind comprising a frame and drive means for actuating a punch to emboss a work piece located at an embossing station in the machine, a carriage mechanism comprising: a carriage member supported on said frame for movement with respect to the embossing station; a carriage drive shaft; means connecting the drive shaft in mechanical driving relationship to the carriage member for moving the carriage member in response to angular displacement of the shaft; a torsion spring, connected to the shaft and to the frame, for biasing the carriage toward movement in a given direction with respect to the embossing station; a ratchet wheel affixed to the drive shaft for rotation therewith; a pawl support member extending transversely of the ratchet wheel and supported from the frame for longitudinal movement with respect thereto; a pair of pawls mounted on the support member; spring means biasing said pawls toward engagement with opposite sides of the ratchet wheel; biasing means connected to the frame and to the pawl support member for normally maintaining one of said pawls in engagement with the ratchet wheel to prevent rotational movement of the shaft; and a drive linkage connecting the pawl support member to the punch drive means for moving the pawl support member longitudinally against said biasing means in response to actuation of said drive means to free said one pawl from engagement with the ratchet wheel and bring the other pawl into engagement therewith.

15. In an embossing machine of the kind comprising a frame and drive means for actuating a punch to emboss a work piece located at an embossing station in the machine, a carriage mechanism comprising: a carriage member supported on said frame for movement with respect to the embossing station; a carriage drive shaft; means connecting the drive shaft in mechanical driving relationship to the carriage member for moving the carriage member in response to angular displacement of the shaft; spring means for biasing the carriage toward movement in a predetermined direction with respect to the embossing station; a ratchet wheel affixed to the drive shaft for rotation therewith; a pawl support member extending transversely of the ratchet wheel and supported from the frame for longitudinal movement with respect thereto; two pawls mounted on the support member and each extending toward engagement with the ratchet wheel; biasing means for normally maintaining one of said pawls in engagement with the ratchet wheel to prevent rotational movement of the shaft; a drive linkage connecting the pawl support member to the punch drive means for moving the pawl support member longitudinally in response to actuation of said drive means to free said one pawl from engagement with the ratchet wheel and bring a second pawl into engagement therewith upon rotation of said drive shaft through a predetermined angular distance in a given direction; a third pawl, normally disengaged from said ratchet wheel; and a second drive linkage, operatively connected to the third pawl, for engaging said third pawl with said ratchet wheel to drive said wheel through a given angular distance in the opposite direction.

16. In an embossing machine of the kind comprising a frame and drive means for actuating a punch to emboss a work piece located at an embossing station in the machine, a carriage mechanism comprising: a carriage member supported on said frame for movement with respect to the embossing station; a carriage drive shaft; means, connecting said drive shaft in mechanical driving relationship to the carriage member, for moving the carriage member in response to angular displacement of the shaft; spring means for biasing the carriage toward movement in a given direction with respect to the embossing station; a ratchet wheel affixed to the drive shaft for rotation therewith; a pair of escapement pawls engageable with said ratchet wheel to control movement of said carriage in said given direction; a drive linkage connecting said pawls to the punch drive means to move said pawls into and out of engagement with said ratchet wheel in response to actuation of said drive means; a back space pawl support member pivotally mounted upon said drive shaft for movement between a normal position and an actuated position; a back space pawl pivotally mounted upon said support member; resilient biasing means for biasing said back space pawl toward said ratchet wheel; cam means normally engaging said back space pawl to prevent said pawl from engaging said ratchet wheel; and manually operable means for pivoting said back space pawl support member from said normal position to said actuated position, thereby disengaging said back space pawl from said cam means and engaging said back space pawl with said ratchet wheel to rotate said wheel and move the carriage member in a direction opposite to said given direction.

17. In an embossing machine of the kind comprising a frame and drive means for actuating a punch to emboss a work piece located at an embossing station in the machine, a carriage mechanism comprising: a carriage member supported on said frame for movement with respect to the embossing station; spring means for biasing the carriage toward movement in a given direction with respect to the embossing station; an escapement mechanism for controlling movement of said carriage member in said given direction, said escapement mechanism including a serrated escapement member mechanically connected to said carriage member and a pair of escapement pawls engageable with said escapement member; a drive linkage connecting said pawls to the punch drive means to move said pawls into and out of engagement with said serrated escapement member in response to actuating of said drive means; a back space pawl support member pivotally mounted for movement between a normal position and an actuated position; a back space pawl pivotally mounted upon said support member; resilient biasing means for biasing said back space pawl toward engagement with said ratchet wheel; cam means comprising a three-lobe cam pivotally mounted on said shaft and having a first lobe normally engaging said back space pawl to prevent said pawl from engaging said escapement member; manually operable means for pivoting said back space pawl support member from said normal position to said actuated position, thereby disengaging said back space pawl from said first lobe of said cam and engaging said back space pawl with said escapement member to move the carriage member in a direction opposite to said given direction; and independent means for rotating said cam to interpose the second and third lobes thereof between said ratchet wheel and said escapement pawls while maintaining said first lobe engaged with said back-space pawl to release said carriage member for movement in said given direction.

References Cited in the file of this patent

UNITED STATES PATENTS

| | | |
|---|---|---|
| 921,600 | Duncan | May 11, 1909 |
| 1,082,535 | Lorenz | Dec. 30, 1913 |
| 2,022,498 | Glogaud et al. | Nov. 26, 1935 |
| 2,265,229 | Gollwitzer | Dec. 9, 1941 |